United States Patent [19]

Hart

[11] 3,829,718

[45] Aug. 13, 1974

[54] INTEGRATED CIRCUIT COMPRISING SUPPLY POLARITY INDEPENDENT CURRENT INJECTOR

[75] Inventor: Cornelis Maria Hart, Emmasingel, Eindhoven, Netherlands

[73] Assignee: U.S. Philips Corporation, New York, N.Y.

[22] Filed: Jan. 4, 1973

[21] Appl. No.: 320,964

[30] Foreign Application Priority Data

Jan. 8, 1972 Netherlands ........................ 7200294

[52] U.S. Cl. ........................ 307/304, 357/40, 357/35, 357/36, 307/303

[51] Int. Cl. ........................ H03k 3/26, H03k 19/08

[58] Field of Search .......... 317/234, 11, 235, 40.12, 317/40.13, 22, 22.1; 307/303, 304

[56] References Cited

UNITED STATES PATENTS

| | | | |
|---|---|---|---|
| 3,414,783 | 12/1968 | Moore | 317/235 Z |
| 3,647,580 | 3/1972 | Weinerth | 317/235 R |
| 3,697,785 | 10/1972 | Gilbert | 317/235 Y |
| 3,699,402 | 10/1972 | McCann et al. | 317/234 N |

FOREIGN PATENTS OR APPLICATIONS

| | | | |
|---|---|---|---|
| 1,206,502 | 9/1970 | Great Britain | 317/234 W |

OTHER PUBLICATIONS

DTL NAND gate, Electronics, pages 116 and 117, June 26, 1967.

*Primary Examiner*—Andrew J. James
*Attorney, Agent, or Firm*—Frank R. Trifari

[57] ABSTRACT

Integrated circuit suitable for any desired supply polarity by means of a rectifier bridge two rectifiers of which are designed as current injectors.

10 Claims, 7 Drawing Figures

INTEGRATED CIRCUIT COMPRISING SUPPLY POLARITY INDEPENDENT CURRENT INJECTOR

Figure 1:
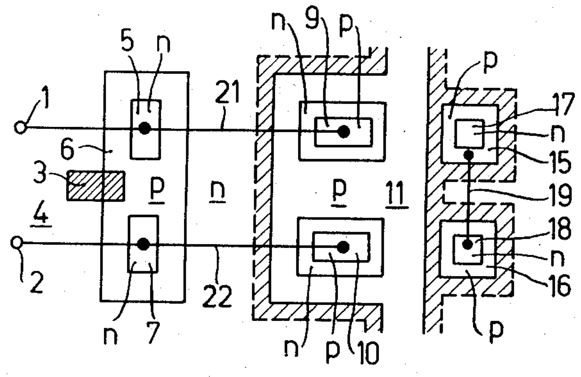

The invention relates to an integrated circuit comprising a semiconductor body and means for automatically ensuring the proper supply polarity, which means comprise two rectifiers having the same pass direction which are connected between a carrier zone of the semiconductor element and two supply terminals.

In a known integrated circuit of this type the said rectifiers shunt the main current paths of two transistor amplifiers in a manner such that on application of one supply polarity one amplifier is rendered operative because the associated rectifier is cut off, whereas the other amplifier is short-circuited by its associated rectifier.

The object of the present invention is not at all to duplicate amplifier stages but to ensure in a simple manner that a supply current of the appropriate polarity reaches amplifiers or other circuit elements on the semiconductor body.

The invention is characterized in that the said rectifiers form part of a rectifier bridge whose pn junctions which, are formed with the carrier zone and are included in two other bridge arms, form part of a current injector for supply current to further circuit elements of the integrated circuit. The invention is related to an invention with respect to current injectors which is described in our co-pending Dutch Pat. application No. 7,107,040 (PHN 5,476). In contradistinction to this prior proposal the present invention relates to two current injector structures, the injecting zone of one structure being polarized in the forward direction and that of the other in the reverse direction with respect to the substrate zone, the carrier zone itself being connected to the supply terminals not directly but via the aforementioned rectifiers.

It is known to provide a correct supply polarity by means of a rectifier bridge comprising four rectifiers. The invention utilizes the recognition that the two other rectifiers of this bridge may be provided so as to be capable of acting as current injectors. The term "current injector" is used herein to mean a multilayer structure having at least three successive layers, or regions, which are separated from each other by rectifying junctions, which layers include a first layer, referred to as injecting layer, which is separated from the circuit element to be supplied with current by at least one rectifying junction, and an adjoining second layer consisting of a semiconductor material, which is referred to as intermediate layer, the injecting layer being connected to a supply terminal, whilst charge carriers are injected from the injecting layer into the intermediate layer and are collected by the third layer of the current injector, referred to as collecting layer, which adjoins the intermediate layer, a zone of one of the circuit elements to be supplied with current, referred to as zone to be biassed, which is separated from the injecting layer and hence from the supply terminal connected thereto, by at least two rectifying junctions, collects, across a rectifying junction bounding this zone, charge carriers from one of the layers of the current injector and thus is supplied with current, the said zone being directly connected to the pattern of metallic interconnections.

Figure 2:
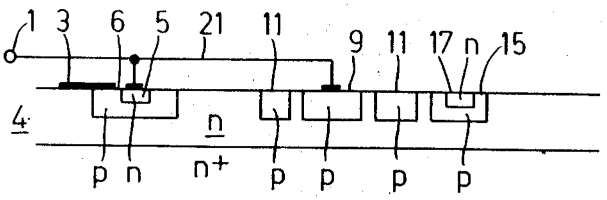
Figure 3:
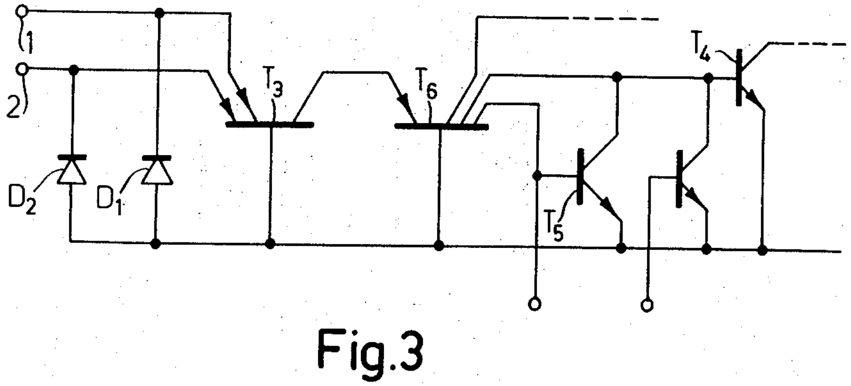
Figure 4:
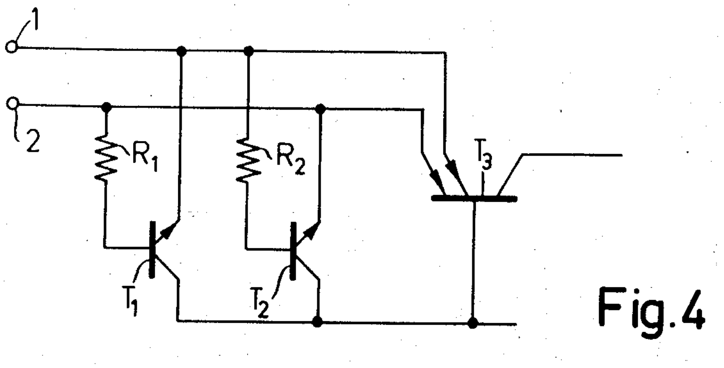

Embodiments of the invention will now be described, by way of example, with reference to the accompanying diagrammatic drawings, in which:

FIG. 1 is a layout of the structure of a semiconductor body according to the invention, FIG. 2 is a side elevation thereof, FIG. 3 is the equivalent circuit diagram of this structure, FIG. 4 shows a modification of the left-hand part of the circuit diagram shown in FIG. 3, and FIGS. 5, 6 and 7 are layouts of structures which correspond to the circuit diagram of FIG. 4.

The semiconductor body shown in FIGS. 1 and 2 comprises a substrate of $n^+$-polarity on which a weakly n-doped zone 4 is epitaxially grown. In this n-type zone 4, hereinafter referred to as carrier zone, vertical npn transistors and lateral pnp transistors have been formed. A supply terminal 1 is connected to an emitter 5 of a first npn vertical transistor, the base 6 of which is connected by a metal interconnection 3 to the carrier zone 4 which serves as the collector of the transistor 5, 6, 4. Owing to this connection 3 the transistor 5, 6, 4 in known manner serves as a rectifier diode $D_1$, shown in FIG. 3. Similarly a supply terminal 2 is connected to an emitter 7 of a vertical npn transistor which has a base 6 and a collector 4 in common with the transistor 5, 6, 4. Thus this second transistor 7, 6, 4 forms the rectifier $D_2$ of FIG. 3. The supply terminals 1 and 2 are also connected to p-type regions 9 and 10 respectively of lateral current injectors, the zones 9 and 10 serving as the injecting layers and the carrier zone 4 serving as the intermediate layer, whilst a p-type collecting layer 11, which surrounds the injecting layers 9 and 10 but is separated therefrom by the intermediate layer 4 and hence is not directly connected to a supply terminal, collects the injected charge carriers and transfers them to semiconductor elements to be supplied with current.

This is effected in that the zone 11 — hereinafter referred to as intermediate injector zone — extends nearly to a large number of semiconductor elements which are to be supplied with current and only two of which are shown in the form of vertical npn transistors formed in the carrier zone 4. The carrier zone 4 serves as the emitter of these vertical transistors, which in FIGS. 1 and 2 have their base zones denoted by 15 and 16 respectively and their collectors by 17 and 18 respectively. Since the base zones 15 and 16 are close to the collecting zone 11 but are separated therefrom by the substrate zone 4, the charge carriers collected by the zone 11 will partly reach the zones 15 and 16 and so ensure the supply of current to the respective transistors.

In the equivalent circuit diagram of FIG. 3, the structure 9, 10, 4, 11 is shown as a transistor $T_3$ having two emitters, which each correspond to one of the zones 9 and 10, a common base, which corresponds to the zone 4, and a common collector, which corresponds to the zone 11. The structures 4, 15, 17 and 4, 16, 18 correspond to transistors $T_4$ and $T_5$ respectively of the equivalent circuit diagram, and the structures 11, 4, 15 and 11, 4, 16 correspond to a transistor $T_6$ of FIG. 3, the zone 11 serving as the emitter of the transistor $T_6$, the carrier zone 4 as its base and the zones 15 and 16 as its collectors. The currents collected by the collectors of the transistor $T_6$ are used to supply base current to the transistors $T_4$ and $T_5$ respectively, but also indirectly to supply collector current to the transistor $T_5$ in that the base zone 15 of the structure 4, 15, 17, which corresponds to the transistor $T_4$, is connected by a metal interconnection 19 to the collector zone 18 of the structure 4, 16, 18 which corresponds to the transistor $T_5$.

The structure shown requires a minimum number of masks and diffusion steps and provides the large advantage that a wide variety of semiconductor elements of the integrated circuit may be supplied with current without a separate metallic connection pattern to each of these semiconductor elements being required. Thus, in addition to leads 21 and 22 between the supply terminal 1 and the zones 5 and 9 and between the supply terminal 2 and the zones 7 and 10 respectively, only metal interconnections between the semiconductor elements, one of which is shown by 19, are required. (These leads and interconnections are shown schematically in FIG. 1 and 2, but in practice they will be provided as metal conductors on an insulating film, for example an oxide film, on the semiconductor body; if desired, in order to reduce the resistance of the intermediate injector zone 11 this zone may be coated at least locally by a metal conductor at areas at which this conductor does not hinder the aforementioned interconnection pattern).

The circuit described operates as follows:

When the semiconductor body is connected to the supply source, the terminal 1 being, for example, positive with respect to the terminal 2, current will flow from the terminal 1 through the lead 21, the pn junction between the zones 9 and 4, which is polarized in the forward direction, the interconnection 3 and the pn junction between the zones 6 and 7, which is operated in the forward direction, to the terminal 2. As a result the carrier zone 4 assumes a potential which but for the voltage drop across the diode $D_2$, i.e., the emitter base threshold voltage between the zones 7 and 6, is equal to the potential of the terminal 2. Because the zone 9 is polarized in the forward direction with respect to the zone 7, charges will be injected from the zone 9 into the zone 4 to be largely collected by the zone 11, because this zone 11 entirely surrounds the zone 9. Thus the zone 11 assumes a potential nearly equal to that of the zone 9, i.e., that of the terminal 1. The ensuing current flowing to the zone 11 is evenly divided between the further zones 15, 16 provided near the zone 11 and further p-type zones of circuit elements to be supplied with current. The injecting edge of the zone 11 is large with respect to the edge of each of the collecting zones 15, 16 and with respect to those of the said further p-type zones. In this respect the zone 10 will also collect part of the current from the zone 11, which consequently is to be considered as a loss current, but because the collecting power of the zone 10 for charges from the zone 11 is small compared with the collecting power of the zone 11 for charges from the zone 9, in other words because the current gain of the transistor $T_6$ in the condition shown is considerably greater than if the transistor $T_6$ were operated in the inverse direction, in which case the emitter and collector would be interchanged, this loss current is negligible in practice.

When the polarity of the voltage at the supply terminals 1, 2 is reversed, the completely symmetrical construction will cause the zone 11 to similarly continue to inject charge into the zones 15 and 16 to be supplied with current.

In order to reduce the voltage drop across the structure 7, 6, 4, i.e., across the diode $D_2$, in the circuit shown in FIG. 2 the rectifiers $D_1$ and $D_2$ are replaced by transistors $T_1$ and $T_2$ connected as rectifiers, either one or the other of these transistors being conducting. These transistors have their emitters, which correspond to the zones 5 and 7 respectively in FIG. 1 and 2, connected to the supply terminals 1 and 2 respectively, whilst their bases are connected via resistors $R_1$ and $R_2$ to current supply terminals 2 and 1 respectively, i.e., each to the terminal other than that to which its emitter is connected. If now, for example, the terminal 1 is positive with respect to the terminal 2, the transistor $T_1$ will be cut off, whereas the transistor $T_2$ is rendered conducting via the resistor $R_2$, but in this case the voltage difference between its emitter and collector, which correspond to the zones 7 and 4 respectively in FIG. 1, now is equal only to the voltage drop across a transistor which is just not driven into saturation, which voltage drop in practice may be, for example, 0.1 volt, whereas in the configuration of the embodiment shown in FIGS. 1 and 2 it is about 0.6 volt. The resistors are proportioned so that the base current of the transistor $T_2$ still is small compared with its emitter collector current, but the voltage between the base and the emitter has the same sign as (and is only slightly greater than) the voltage between the base and the collector.

Figure 5:
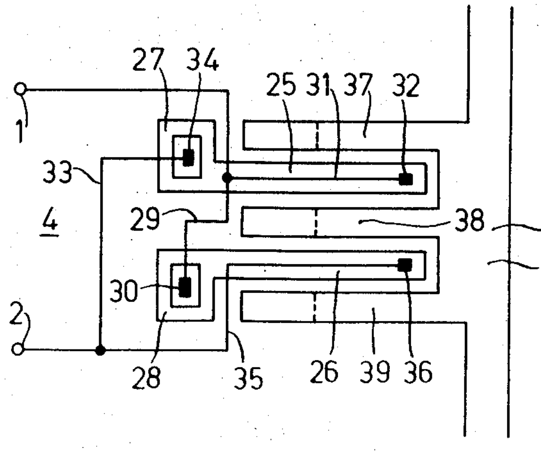

In the layout shown in FIG. 5 the resistor $R_1$ and $R_2$ are formed as extensions 25 and 26 of the base zones 27 and 28 of the transistor structures which correspond to 7, 6, 4 and 5, 6, 4 respectively. The terminal 1 is connected by a lead 29 to the emitter 30 of one pnp transistor the collector of which in this structure also is formed by the carrier zone 4 and by a lead 31 to a contact pad 32 on the base resistor 25. Similarly the terminal 2 is connected by a lead 33 to the emitter 34 of the other npn transistor and by a lead 35 to a contact pad 36 on the base resistor 26. The zone 11, the function of which entirely corresponds to that which it has in the layout shown in FIG. 1, is provided with fingers 37, 38 and 39 which partly embrace the zones 25 and 26.

Assuming the supply polarity to be such that the terminal 1 is positive with respect to the terminal 2, there will be applied to the zone 25 via the contact pad 32 a forward voltage which causes the base zone 27 to be polarized in the forward direction with respect to the emitter zone 34, so that the structure 34, 27, 4 is rendered conductive and hence the substrate zone 4 assumes substantially the potential of the terminal 2. On the other hand the zone 25, at least in the proximity of the contact pad 32, will emit a considerable amount of charges into the substrate zone 4, which are collected by the fingers 37 and 38 of the zone 11. At the same time the transistor structure comprising the zones 30, 28 and 4 is rendered non-conductive, inter alia owing to the small voltage difference between the zones 4 and 28, so that substantially no current flows in this structure.

The base resistor formed by the zone 26 will, at least in the proximity of the contact pad 36, collect current which is injected from the fingers 38 and 39 of the zone 11 into the substrate zone 4, and this current is again to be regarded as a loss current. To reduce this current the fingers 37, 38 and 39 preferably embrace the resistance zones 25 and 26 partly only, as in indicated by broken lines, for owing to the voltage drop across the resistance zone 25 the voltage difference of this zone 25 relative to the substrate zone 4 will be greatest in the proximity of the contact pad 32, so that in this area the largest injection into the zone 11 takes place. Consequently, shortening the fingers 37 and 38 does not greatly reduce the useful injection into the zone 11, but does reduce the loss current flowing from the fingers 38 and 39 to the zone 26.

Figure 6:
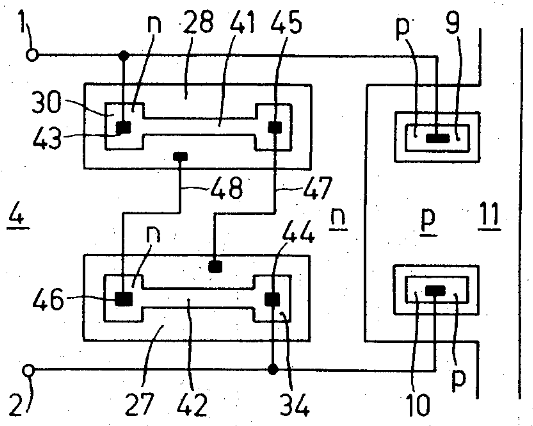

FIG. 6 shows another solution of this problem which enables these loss currents to be further reduced. In this embodiment the base zones 27 and 28 are expanded so as to enable them to contain resistance zones 42 and 41 respectively which are in the form of (n-type) extended portions of the associate emitter zones 34 and 30 respectively. The terminal 1 here also is connected to the n-type emitter zone 30 at the site of the contact pad 43 and also to the p-type injection zone 9. Similarly the terminal 2 is connected to the n-type emitter zone 34 at the site of the contact pad 44 and also to the p-type injector zone 10. The ends 45 and 46 of the resistance zones 41 and 42 more remote from the contact pads 43 and 44 respectively are connected to the base zones 27 and 28 via metal interconnections 27 and 48 respectively.

Assuming again that the terminal 1 has positive polarity with respect to the terminal 2, current flowing via the contact pad 43, the resistance zone 41, the contact pad 45 and the metal interconnection 47 will polarize the base zone 27 in the forward direction with respect to the emitter zone 34, so that the structure 34, 37, 4 becomes highly conducting and the carrier zone 4 substantially assumes the potential of the terminal 2. Consequently the injector zone 9 will be polarized in the forward direction with respect to the carrier zone 4, so that charges are injected, which are collected by the zone 11. However, the inclusion of the resistance zones 41 and 42 in the base zones 28 and 27 respectively prevents these base zones from giving rise to undesirable collector action. This is inter alia due to the fact that when the structure 34, 27, 4, which corresponds to the transistor $T_2$ in FIG. 4, is in the highly conducting condition the inverse current conduction by the transistor $T_1$, which corresponds to the structure 30, 28, 4, is prevented.

Figure 7:
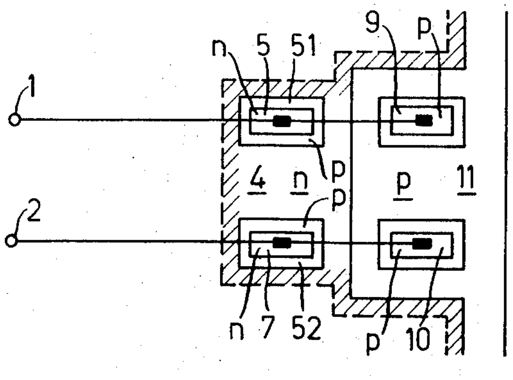

An additional effect is that the zone 6 in FIGS. 1 and 2 and the zones 27 and 28 in FIGS. 5 and 6 can directly collect injection current from the zone 11. If this is regarded as an undesirable phenomenon, these zones 6 or 27 and 28 are to be spaced by an appropriate distance from the zone 11, or another provision is to be made to ensure that these currents are avoided, for example by the interposition of a finger-shaped p-type zone which may be connected to the carrier zone 4. As an alternative, however, this current may turned to account, as is shown in FIG. 7, by locating the base zones 51 and 52 of the npn-structures 5, 51, 4 and 7, 52, 4 respectively in the proximity of the zone 11, so that part of the current from the zone 11 is used to render the relevant transistor structure conductive. If, for example, the terminal 1 is again positive with respect to the terminal 2, the pn-junction 9, 4 and the pn-junction 52, 7 will be polarized in the forward direction. Thus the four zones 9, 4, 52 and 7 form a pnpn-structure which may become astable is a sufficient number of free charges occur. These free charges are obtainable, for example, by connecting resistors to suitably chosen points; the simplest manner of producing these free charges is to apply a short duration sufficiently high start pulse between the supply terminals or to irradiate the semiconductor element with radiation of sufficient intensity for a given time. When in this manner charge injection from the injector zone 9 into the carrier zone 4 has been started, charges will be collected by the zone 11 to be partly injected again into the zone 4 in the proximity of the zone 52, by which they are collected whereupon they will reach the supply terminal 2 via the zone 7. The injection current from the zone 9 will be substantially entirely collected by the zone 11; because this zone 11, however, supplies current to a large number of circuit elements — in the same manner as is indicated in FIGS. 1 and 2 — only a small portion of this current will reach the zone 52. There this current acts as the base current of the vertical transistor 7, 52, 4 and may be large enough to maintain this transistor in its highly conducting condition.

In the examples described so far the injector zone 9 or 10 together with the carrier zone 4 and the intermediate injector zone 11 forms a lateral transistor. In principle the injector may also be designed as a vertical transistor by starting from a p-type substrate instead of from the $n^+$-type layer of FIG. 2, forming an epitaxial n-type layer corresponding to the carrier zone 4 of FIG. 2 on the substrate, and by forming in this epitaxial layer vertical transistor structures which correspond to 15, 17 and 16, 18 of FIGS. 1 and 2, rectifier structures which correspond to 3, 4, 5, 6, 7 in FIGS. 1 and 2, and injectors which correspond to zones 9 and 10 in FIGS. 1 and 2, which are similarly connected to the supply voltage terminals. (Thus the zone 11 of FIGS. 1 and 2 is dispensed with). When a supply voltage is applied the rectifier structures will similarly ensure that the n-type epitaxial substrate zone assumes a potential nearly equal to that of the negative supply terminal, whilst the current from the injector zone connected to the positive supply terminal will reach, through the n-type epitaxial substrate zone, the p-type substrate and via the latter may serve to supply current to the various transistor structures on the semiconductor body. However, the advantage of this solution that the zone 11 is dispensed with is offset by the disadvantage that the operation of the substrate zone as a low-resistance supply current conductor and as an emitter for the structures corresponding to 15, 17 and 16, 18 of FIG. 1 is performed with considerably less efficiency, because the favourable effect of the $n^+$-doped substrate of FIG. 2 is absent.

Further steps described in the aforementioned copending Patent Application of prior date may advantageously be applied to the aforedescribed embodiments. In particular the efficiency is considerably increased by surrounding the intermediate injector zone 11 and the zones to be supplied with current by an isolating or $n^+$-doped zone (shown shaded in FIG. 1) which, if desired, may extend into the $n^+$-doped substrate and substantially prevents the injected charges from leaking away. In FIG. 7 a similar step may be taken with respect to the intermediate injector zone 11 and the rectifier structures 5, 51, 4 and 7, 52, 4.

Obviously all the dopings mentioned may be of the opposite types, in which case the voltage polarities also will be reversed. Furthermore, if desired, a supply alternating current may be applied to the terminals 1 and 2; in this case the capacitance between the zones 4 and 11 is preferably increased by providing these zones with contact pads between which a capacitor is connected.

What is claimed is:

1. An integrated circuit comprising:

a. a semiconductor body comprising semiconductor circuit elements and a carrier zone, b. means for supplying electrical potential to said semiconductor body, c. a rectifier bridge disposed at said semiconductor body and comprising bridge arms, said bridge comprising two respective first rectifier elements disposed in said carrier zone and said rectifier included in respective first ones of said bridge arms to form part of said bridge, said rectifier elements being electrically connected between said potential supplying means and said carrier zone, d. further rectifier elements disposed in second ones of said bridge arms, and e. means for automatically ensuring the appropriate supply current polarity to said semiconductor elements, said means comprising current injector elements respectively disposed in said second bridge arms and being in current supply relationship with said circuit elements.

2. An integrated circuit as claimed in claim 1, wherein said current injector elements comprise lateral transistors.

3. An integrated circuit as claimed in claim 1, wherein said circuit elements comprise circuit zones for receiving current from respective said current injector elements and said current injector elements comprise a zone having an edge area substantially larger than that of each of said circuit element zones.

4. An integrated circuit as claimed in claim 1, wherein said first rectifiers comprise vertical transistors disposed in said carrier zone and that respectively comprise collector regions, emitter regions that are connected to said potential supply means through resistors.

5. An integrated circuit as claimed in claim 4, wherein said resistors comprise extensions of said base zones of said vertical transistors provided in said carrier zone.

6. An integrated circuit as claimed in claim 5, wherein said extensions further comprise a part of said current injector elements.

7. An integrated circuit as claimed in claim 5, wherein said resistors comprise extensions of said emitter zones of said vertical transistors, said extensions projecting into said base zones.

8. An integrated circuit as claimed in claim 1, wherein said first rectifiers comprise vertical transistors provided in said carrier zone and disposed proximity to said current injector elements so as to be supplied with the required base currents thereby.

9. An integrated circuit as claimed in claim 1, herein said current injector element and the zones of said circuit elements to be supplied with current are laterally surrounded by a highly doped zone, so as to prevent injection currents from leaking away.

10. An integrated circuit as claimed in claim 1 suitable for alternating-current supply, wherein a capacitor element is connected between an injecting zone of the current injector element and the carrier zone.

* * * * *